HAKKI YARATAN
INVENTOR.

BY Wenderoth, Lind & Ponack
ATTORNEYS

United States Patent Office 2,829,497
Patented Apr. 8, 1958

2,829,497

SAFETY DEVICE FOR HYDRAULIC BRAKES

Hakki Yaratan, Bostanci, Istanbul, Turkey

Application July 21, 1954, Serial No. 444,696

6 Claims. (Cl. 60—54.5)

This invention relates to a safety device for hydraulic brakes.

One of the major disadvantages of hydraulic brakes as used on automotive vehicles and the like is that if there is a sudden failure of hydraulic pressure in the system, the brakes become useless. The brake systems presently in use on the majority of automobiles, trucks and the like are comprised of a master cylinder and piston and brake cylinders and pistons at each wheel or at each position at which a braking mechanism is used. The pressure lines lead from a common chamber adjacent the master cylinder to each of the brake cylinders. If a breakdown occurs in one of the lines or at one of the brake cylinders, the pressure throughout the system is lost immediately, and consequently none of the brakes are able to function. A failure of one results in the remainder becoming useless.

It is an object of this invention to provide a safety device which will overcome these disadvantages and which will function when a breakdown occurs in one of the brake cylinders or in one of the pressure lines leading to those cylinders to seal off the faulty section of the hydraulic system.

Other objects and advantages will become apparent from the following specification and claims taken together with the accompanying drawings, in which:

Figure 1:
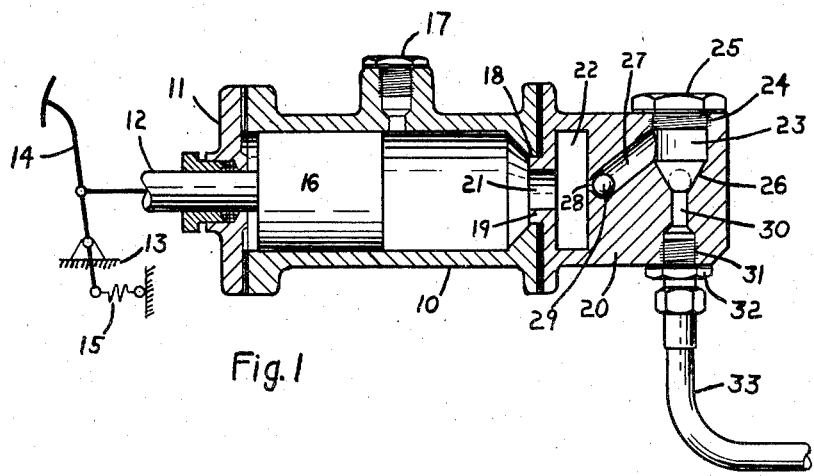
Figure 1 is a section in elevation of the master cylinder and piston of a hydraulic brake system according to this invention, showing schematically the footpedal arrangement by which the master cylinder piston is operated.

Referring now to the drawings, in which like reference numerals represent like parts, the master cylinder 10 of a conventional hydraulic brake system for automotive vehicles and the like is provided with a head 11 through which a piston rod 12 is adapted to slide. Pivotally mounted on the frame 13 of the vehicle and pivotally attached to the piston rod 12 is brake pedal 14 which has a spring 15 attached to one end thereof which acts to return the brake pedal to its normal position. Piston 16 is fitted within cylinder 10. The hydraulic fluid for the system may be supplied through inlet 17.

In the end of the cylinder opposite the head 11 is outlet 18 into which is fitted an annular extension 19 of valve body 20. A passage 21 extends through the annular extension to chamber 22 which extends the entire width of the valve body 20.

In the end of the valve body 20 opposite the passage 21 and chamber 22 is a plurality of cylindrical recesses 23, one for each brake cylinder and piston in the system. Threaded apertures 24 give access to these cylindrical spaces from the top of the valve body 20 and caps 25 serve to close the apertures.

The bottoms 26 of the cylindrical spaces 23 are conical in shape and are ground to form a valve seat as set forth below.

Between each cylindrical space 23 and the chamber 22 is a channel 27 inclined to the horizontal axis of the master cylinder. It is preferred to incline these channels at seventy-five degrees. The apertures 28 through which these channels 27 open into the chamber 22 are smaller than the channels 27 themselves. Within each channel is positioned a ball 29 which is slightly smaller in diameter than the channel.

From the apex of the conical bottoms 26 of the cylindrical recesses outlet passages 30, which are smaller in diameter than the balls 29, extend to the exterior of valve body 20, where they terminate in threaded sections 31. Into the threaded sections are screwed fittings 32 which serve as terminals for pressure lines 33 which lead to the individual brake cylinders and pistons.

Figure 2:
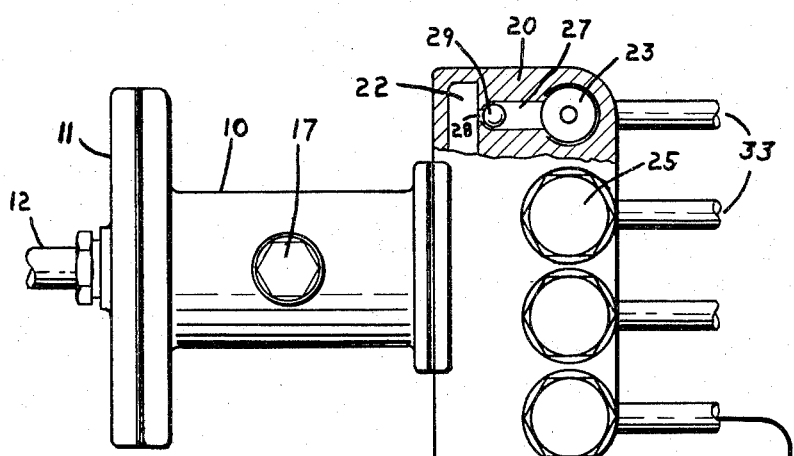
Figure 2 is a plan view, partially cut away of the hydraulic brake system shown in Figure 1.
Figure 3:
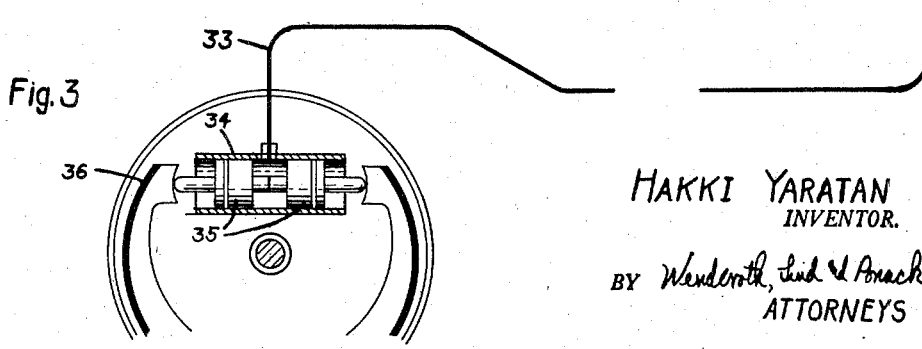
Figure 3 is an elevation view of one of the brake cylinders and pistons showing a portion of the brakes acted upon.

Figure 3 shows a portion of a conventional assembly of a brake cylinder and piston mounted adjacent the brake shoe assembly on the wheel of an automotive vehicle. Cylinder 34 contains double acting pistons 35 from which rods lead to the ends of the brake shoes 36. The pressure line 33 leads into the cylinder 34 from the valve body 20, shown in Figures 1 and 2.

The system is filled with a hydraulic fluid, through which pressure exerted on the fluid by the master cylinder piston 16 is transmitted to the brake pistons 35. As a result of the movement of the brake pistons, a certain amount of the hydraulic fluid is displaced by the movement of the master cylinder piston. The volume of each of the inclined channels 27 is approximately twice the volume of its corresponding brake cylinder 34, so that about half the volume of hydraulic fluid in each of the inclined channels is displaced when pressure is applied by the master cylinder piston to cause displacement of the brake pistons and consequent displacement of the hydraulic fluid.

In normal operation the pressure of a foot on brake pedal 14 is transmitted through rod 12 to master cylinder piston 16 and through the hydraulic fluid to brake pistons 35. Since balls 29 are slightly smaller in diameter than channels 27 the displacement of hydraulic fluid will cause the balls to move up the incline about half the length of the channels. The balls do not in any way interfere with this normal operation.

However, should a rupture occur in any of the pressure lines 33 or in the brake cylinders 34 or in any of the fittings connecting them, a certain amount of hydraulic fluid in the channel serving the particular pressure line and brake cylinder will be displaced to occupy the space left by the hydraulic fluid which leaks out or is forced out through the rupture. This displacement will cause a corresponding displacement of the ball 29 in the channel 27. When an amount of fluid sufficient to fill the portion of the channel between the ball and the cylindrical recess 23 is displaced, the ball 29 will be carried into the cylindrical space and will drop into the conical bottom 26. Since the diameter of the ball 29 is greater than the diameter of the passage 30 leading from the space 23 to the pressure line 33, the passage will be blocked and the ball will coact with the ground portion of the conical wall to act as a valve to seal off the pressure line and brake cylinder and piston in which the rupture has taken place.

It usually happens that a rupture occurs when braking pressure is being applied and results in immediate loss of pressure and the displacement of a relatively large amount of hydraulic fluid. When this occurs, the ball will change position almost immediately to seal off the ruptured section of the brake system.

Because each section of the brake system is served by a separate inclined channel, cylindrical space and ball, it is obvious that a rupture or failure in any one part of the system will not effect the operation of the remainder of the system. It is conceivable that three of the four parts of the brake system shown could fail, and with a safety device constructed according to this invention installed in the system, the fourth brake could continue to operate normally. A loss of braking power in one of the brakes therefore does not automatically mean loss of all braking power. The vehicle equipped with this device can continue to operate until repair facilities can be reached and the failure repaired.

The brakes may be easily adjusted even though a safety device according to the invention is installed. The balls are removed from channels 27 by removing the drain cap from the brake cylinders and quickly applying a pressure to the brake pedal. A certain amount of fluid will be forced out of the brake cylinders 34 and thus cause the balls 29 to be forced out of the inclined channels 27 into the cylindrical spaces 23. The balls can then be removed through the apertures 24 after removing the caps 25. The caps can then be replaced, the system purged and the stroke of the brake pedal adjusted. The caps are then removed again and the balls replaced in the inclined channels.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A hydraulic brake system comprising a master cylinder, means to supply hydraulic fluid to said cylinder, a piston slidable in said master cylinder having a piston rod thereon extending outside of said cylinder, means to actuate said piston rod, a single valve body attached to said cylinder having a plurality of substantially vertical recesses disposed side by side therein each having an outlet and a valve seat surrounding said outlet in the bottom of said recess, said valve body further having a chamber with an aperture therein which aperture leads from said master cylinder to said chamber, and said valve body further having a plurality of inclined channels disposed side by side therein, one for each of said recesses, said channels extending between said chamber and said recesses, a plurality of balls of a size larger than said outlets in said recess slidable in said channels, said channels each having a seat therein adjacent said chamber to seat said balls, a plurality of brake cylinders and pistons, one for each of said vertical recesses, adapted to act on brake shoes, and pressure lines connecting each of said outlets in said vertical recesses with one of said brake cylinders.

2. A hydraulic brake system as claimed in claim 1 in which said channels in said valve body are inclined at 75°.

3. A hydraulic brake system as claimed in claim 1 in which the volume of each of said inclined channels is twice the volume of each of said brake cylinders.

4. In a hydraulic brake system having a master cylinder and pressure lines to a plurality of brake cylinders, a safety device comprising a single valve body attached to said master cylinder having a plurality of recesses disposed side by side therein, each recess having an outlet and a valve seat surrounding said outlet in the bottom of said recess, said valve body further having a chamber with an aperture therein, said aperture leading from said master cylinder into said chamber, said valve body further having a plurality of inclined channels disposed side by side therein, one for each of said recesses, said channels extending between said chamber and said recesses, a plurality of balls of a size larger than said outlets in said recesses slidable in said channels, each of said channels having a seat therein adjacent said chamber to seat said balls, said pressure lines being attached to said outlets in said valve body.

5. A safety device as claimed in claim 4 in which said channels in said valve body are inclined at 75°.

6. A safety device as claimed in claim 4 in which the volume of said inclined channels is twice the volume of said brake cylinders.

References Cited in the file of this patent

UNITED STATES PATENTS

| | | |
|---|---|---|
| 1,557,330 | Reynolds | Oct. 13, 1925 |
| 2,054,900 | Friedmann et al. | Sept. 22, 1936 |
| 2,074,889 | Brannan | Mar. 23, 1937 |
| 2,105,748 | McCarty | Jan. 18, 1938 |
| 2,218,036 | Deutsch | Oct. 15, 1940 |
| 2,529,306 | Morris | Nov. 7, 1950 |